United States Patent
Pang et al.

(10) Patent No.: US 10,412,226 B2
(45) Date of Patent: Sep. 10, 2019

(54) AUDIO SIGNAL PROCESSING APPARATUS AND METHOD

(71) Applicant: Huawei Technologies Co., Ltd., Shenzhen (CN)

(72) Inventors: Liyun Pang, Munich (DE); Pablo Hoffmann, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 15/679,939

(22) Filed: Aug. 17, 2017

(65) Prior Publication Data

US 2017/0346951 A1    Nov. 30, 2017

Related U.S. Application Data

(63) Continuation of application No. PCT/EP2015/058694, filed on Apr. 22, 2015.

(51) Int. Cl.
*H04S 7/00*    (2006.01)
*H04M 3/56*    (2006.01)

(52) U.S. Cl.
CPC ........... *H04M 3/568* (2013.01); *H04S 7/30* (2013.01); *H04S 2400/11* (2013.01)

(58) Field of Classification Search
CPC ....... H04M 3/568; H04S 7/30; H04S 2400/11
USPC .................................................. 379/202.01
See application file for complete search history.

(56) References Cited

U.S. PATENT DOCUMENTS

| 7,391,877 B1 | 6/2008 | Brungart |
| 2003/0026441 A1 | 2/2003 | Faller |
| 2007/0019812 A1 | 1/2007 | Kim |
| 2007/0217590 A1 | 9/2007 | Loupia et al. |
| 2007/0263823 A1 | 11/2007 | Jalava et al. |

(Continued)

FOREIGN PATENT DOCUMENTS

| CN | 104205790 A | 12/2014 |
| EP | 1995993 A1 | 11/2008 |

(Continued)

OTHER PUBLICATIONS

Bronkhorst, "The Cocktail Party Phenomenon: A Review of Research on Speech Intelligibility in Multiple-Talker Conditions," The Journal of the European Acoustics Association, vol. 86, pp. 117-128, S. Hirzel Verlag, Stuttgart, Germany (2000).

(Continued)

*Primary Examiner* — Ahmad F. Matar
*Assistant Examiner* — Jirapon Intavong
(74) *Attorney, Agent, or Firm* — Leydig, Voit & Mayer, Ltd.

(57) ABSTRACT

The disclosure relates to an audio signal processing apparatus for processing a plurality of audio signals defining a plurality of audio signal spectra, the audio signals to be transmitted to a listener in such a way that the listener perceives the audio signals to originate from virtual positions of a plurality of audio signal sources. The audio signal processing apparatus comprises a selector configured to select a spatial arrangement of the virtual positions of the audio signal sources relative to the listener from a plurality of possible spatial arrangements, and a filter configured to filter the plurality of audio signals on the basis of the selected spatial arrangement.

14 Claims, 8 Drawing Sheets

(56) References Cited

U.S. PATENT DOCUMENTS

| | | | |
|---|---|---|---|
| 2009/0046865 A1* | 2/2009 | Ito | H04S 7/30 |
| | | | 381/17 |
| 2009/0112589 A1 | 4/2009 | Hiselius et al. | |
| 2010/0274558 A1 | 10/2010 | Yamanashi et al. | |
| 2010/0316232 A1 | 12/2010 | Acero et al. | |
| 2011/0026745 A1 | 2/2011 | Said et al. | |
| 2015/0055770 A1* | 2/2015 | Spittle | H04M 3/568 |
| | | | 379/202.01 |
| 2015/0244869 A1* | 8/2015 | Cartwright | H04M 3/568 |
| | | | 370/260 |
| 2015/0296086 A1 | 10/2015 | Eckert et al. | |

FOREIGN PATENT DOCUMENTS

| | | |
|---|---|---|
| JP | 2006254064 A | 9/2006 |
| JP | 2006279588 A | 10/2006 |
| JP | 2007208318 A | 8/2007 |
| JP | 2008131193 A | 6/2008 |
| RU | 2330390 C2 | 7/2008 |
| WO | 2007119330 A1 | 10/2007 |
| WO | 2009081568 A1 | 7/2009 |
| WO | WO 2013142641 A1 | 9/2013 |
| WO | WO 2013142668 A1 | 9/2013 |
| WO | 2014130221 A1 | 8/2014 |

OTHER PUBLICATIONS

Brungart et al., "Isolating the energetic component of speech-on-speech masking with ideal time-frequency segregation," vol. 120, No. 6, pp. 4007-4018, Journal of the Acoustical Society of America (Dec. 2006).

Brungart et al., "Multitalker speech perception with ideal time-frequency segregation: Effects of voice characteristics and number of talkers," vol. 125, No. 6, pp. 4006-4022, Journal of Acoustical Society of America (Jun. 2009).

Hawley et al., "Speech intelligibility and localization in a multi-source environment," vol. 105, No. 6, pp. 3436-3448, Journal of Acoustical Society of America (Jun. 1999).

Hawley et al., "The benefit of binaural hearing in a cocktail party: Effect of location and type of interferer," vol. 115, No. 2, pp. 833-843, Journal of the Acoustical Society of America (Feb. 2004).

Langendijk et al., "Contribution of spectral cues to human sound localization," vol. 112, No. 4, pp. 1583-1596, Journal of the Acoustical Society of America (Oct. 2002).

"Series P: Terminals and Subjective and Objective Assessment Methods; Telemeeting assessment; Subjective quality evaluation of audio and audiovisual multiparty telemeetings," Recommendation ITU-T P.1301, pp. i-60, International Telecommunication Union, Geneva, Switzerland (Jul. 2012).

* cited by examiner

Fig. 8B  Subset of most different HRTFs

{A, B, C, D, E}

{5, 1, 3, 2, 4}

Ranked speakers

AUDIO SIGNAL PROCESSING APPARATUS AND METHOD

CROSS-REFERENCE TO RELATED APPLICATIONS

This application is a continuation of International Application No. PCT/EP2015/058694, filed on Apr. 22, 2015, the disclosure of which is hereby incorporated by reference in its entirety.

TECHNICAL FIELD

The present disclosure relates to an audio signal processing apparatus and method. In particular, the present disclosure relates to an audio signal processing apparatus and method for a virtual spatial audio conference system.

BACKGROUND

In the past the voices of speakers in a multi-party audio conference system typically have been rendered to the listeners as a monaural audio stream—essentially overlaid on top of each other and usually presented to the listener "within the head" when headphones are used.

A virtual spatial audio conference system, which is a special form of a multiparty telemeeting as defined by the ITU-T recommendation P.1301 "Subjective quality evaluation of audio and audiovisual multiparty telemeetings", enables a 3D audio rendering of the voices of the participants. That is, the participants' voices are placed at different "virtual" locations in space by using spatial filters derived from head-related impulse responses (HRIR) or their corresponding frequency-domain representations, i.e. head-related transfer functions (HRTFs), and/or binaural room impulse responses (BRIR) or their corresponding frequency-domain representations, i.e. binaural room transfer functions (BRTF). These filters encode the auditory cues humans use for spatial sound perception, namely interaural time difference (ITD), interaural level difference (ILD), spectral cues, and also room acoustic information, such as reverberation in the case of BRIRs. The beneficial effect of 3D audio rendering relative to a monaural audio stream of the voices of the participants is not only that the conference experience is more natural, but that also speech intelligibility is substantially enhanced. It has been shown that this psychoacoustic effect, scientifically known as spatial release from masking, can improve speech intelligibility by up to 12-13 dB when a target speaker and competing speakers, typically referred to as maskers, are virtually spatially separated.

U.S. Pat. No. 7,391,877 describes a spatial sound processor that virtually distributes speakers over non-equidistant positions along a circle centered at the listener's position. Based on results from psychoacoustic tests on speech identification the system starts with a relatively small virtual spatial separation for speakers placed in front of the listener. The virtual spatial separation between speakers is then increased as speakers are placed at more lateral positions. For directions ±90 degrees in azimuth, two virtual speaker locations are proposed, one in the far-field and one in the near-field. Similar solutions based on either equidistant or non-equidistant speakers are described in WO2013/142641 and WO2013/142668.

There have been some attempts to use the information contained in the voice signals themselves to enhance speech intelligibility. These attempts, i.e. the use of voice information to separate maskers from speakers, rely heavily on the amount of spectral overlap that exists between a target speaker and maskers, i.e. energetic masking. Ideal time-frequency binary masks have been proposed, for instance in Brungart et al "Isolating the energetic component of speech-on-speech masking with ideal time-frequency segregation", J. Acoust. Soc. Am., volume 120, no. 6, 2006, in order to remove time-frequency regions where masker(s) energy dominates and preserve only those time-frequency regions where the energy of the target's voice dominates. They are ideal because access to the clean (original) speech signals from target speaker and masker(s) speaker(s) is required. More specifically, a priori knowledge about the target speaker and masker speakers is required so that those time-frequency regions of the acoustic mixture dominated by the target speaker can be preserved. In practice, however, sometimes the target speaker is not known a priori or is variable. In a virtual spatial audio conference, for instance, each participant can be the target speaker for a certain period of time.

Thus, there is a need for an improved audio signal processing apparatus and method, in particular an audio signal processing apparatus and method improving speech intelligibility in a virtual spatial audio conference system.

SUMMARY

It is an objective of the disclosure to provide an audio signal processing apparatus and method which allows to improve speech intelligibility in a virtual spatial audio conference system.

Embodiments of the disclosure are provided by the subject matter of the independent claims. Further implementation forms are provided in the dependent claims, the description and the figures.

According to a first aspect the disclosure relates to an audio signal processing apparatus for processing a plurality of audio signals defining a plurality of audio signal spectra, the plurality of audio signals to be transmitted to a listener in such a way that the listener perceives the plurality of audio signals to originate from virtual positions of a plurality of audio signal sources. The audio signal processing apparatus comprises a selector configured to select a spatial arrangement of the virtual positions of the plurality of audio signal sources relative to the listener from a plurality of possible spatial arrangements of the virtual positions of the plurality of audio signal sources relative to the listener, wherein each possible spatial arrangement of the virtual positions of the plurality of audio signal sources is associated with a plurality of transfer functions, and wherein the selector is configured to select the spatial arrangement of the virtual positions of the plurality of audio signal sources on the basis of the plurality of audio signal spectra and the plurality of transfer functions associated with each possible spatial arrangement of the virtual positions of the plurality of audio signal sources, and a filter configured to filter the plurality of audio signals on the basis of the selected spatial arrangement of the virtual positions of the plurality of audio signal sources relative to the listener, wherein the plurality of filtered audio signals are perceived by the listener to originate from the virtual positions of the plurality of audio signal sources defined by the selected spatial arrangement of the virtual positions of the plurality of audio signal sources relative to the listener.

Thus, an audio signal processing apparatus is provided allowing for improving, for instance, the speech intelligibility in a virtual spatial audio conference system using both voice (i.e. audio signal spectra) and directional (i.e. transfer functions) information for selecting an improved spatial arrangement.

The plurality of audio signals can comprise N audio signals and the virtual positions of the plurality of audio signal sources can comprise L virtual positions. The transfer functions can be head related transfer functions (HRTFs) or binaural room transfer functions (BRTFs).

In a first possible implementation form of the first aspect of the disclosure, the selector is configured to select the spatial arrangement of the virtual positions of the plurality of audio signal sources by combining the plurality of audio signal spectra and the plurality of transfer functions associated with each possible spatial arrangement of the virtual positions of the plurality of audio signal sources to obtain a plurality of directional-speaker spectral profiles associated with each possible spatial arrangement of the virtual positions of the plurality of audio signal sources and to select the spatial arrangement of the virtual positions of the plurality of audio signal sources on the basis of the plurality of directional-speaker spectral profiles.

In this implementation form voice and directional information is combined into directional-speaker spectral profiles for selecting an improved spatial arrangement.

In a second possible implementation form of the first possible implementation form of the first aspect of the disclosure, the selector is configured to combine the plurality of audio signal spectra and the plurality of transfer functions associated with each possible spatial arrangement of the virtual positions of the plurality of audio signal sources to obtain a plurality of directional-speaker spectral profiles associated with each possible spatial arrangement of the virtual positions of the plurality of audio signal sources by multiplying the plurality of audio signal spectra by the plurality of transfer functions associated with each possible spatial arrangement of the virtual positions of the plurality of audio signal sources.

This implementation form provides a computationally efficient form for combining voice and directional information into a directional-speaker spectral profile by multiplying the spectra.

In a third possible implementation form of the first or second implementation form of the first aspect of the disclosure, the selector is configured to select the spatial arrangement of the virtual positions of the plurality of audio signal sources by selecting one of the plurality of possible spatial arrangements of the virtual positions of the plurality of audio signal sources for which a spectral difference between the plurality of directional-speaker spectral profiles is larger than a predefined threshold value, preferably a maximum.

This implementation form provides for a good speech intelligibility using the spectral difference to determine advantageous spatial arrangements. On the basis of the spectral difference this implementation form allows determining the optimal spatial arrangement.

In a fourth possible implementation form of the third implementation form of the first aspect of the disclosure, the selector is configured to determine the spectral difference between the directional-speaker spectral profiles associated with the m-th spatial arrangement of the virtual positions of the plurality of audio signal sources using the following equations:

$$S_m = \frac{1}{K} \sum_{k=1}^{K} w_k \sigma_{m,k},$$

-continued $$\sigma_{m,k} = \frac{1}{N} \sum_{n=1}^{N} (Y_{n,m,k} - \overline{Y}_{m,k})^2, \text{ and}$$

$$Y_{n,m,k} = X_{n,k} H_{m,k},$$

wherein $S_m$ denotes a scalar value representing the spectral difference between the plurality of directional-speaker spectral profiles associated with the m-th spatial arrangement of the virtual positions of the plurality of audio signal sources, K denotes the total number of frequency bands, $w_k$ denotes a weighting factor, $\sigma_{m,k}$ denotes the variance across the directional-speaker spectral profiles for the k-th frequency band, N denotes the total number of audio signal spectra, $Y_{n,m,k}$ denotes the value of the n-th directional-speaker spectral profile in the k-th frequency band, $\overline{Y}_{m,k}$ denotes the mean of the directional speaker profiles in the k-th frequency band, $X_{n,k}$ denotes the value of the audio signal spectrum of the n-th audio signal in the k-th frequency band and $H_{m,k}$ denotes the value of the transfer function associated with the virtual position of the audio signal source associated with the n-th audio signal in the k-th frequency band.

In a fifth possible implementation form of the fourth implementation form of the first aspect of the disclosure, the selector is configured to determine the value of the audio signal spectrum of the n-th audio signal in the k-th frequency band, i.e. $X_{n,k}$, and/or the value of the transfer function associated with the virtual position of the audio signal source associated with the n-th audio signal in the k-th frequency band, i.e. $H_{m,k}$, by performing an averaging operation over a plurality of frequency bins (used for a discrete Fourier transform) on the basis of the following equations:

$$X_{n,k} = \frac{1}{J(k)} \sum_{i=j(k)}^{j(k+1)-1} |\mathcal{X}(i)|, \text{ and}$$

$$H_{m,k} = \frac{1}{J(k)} \sum_{i=j(k)}^{j(k+1)-1} |\mathcal{H}(i)|,$$

wherein $\mathcal{X}(i)$ denotes the value of the discrete Fourier transform of the n-th audio signal in the i-th frequency bin, $\mathcal{H}(i)$ denotes the value of the discrete Fourier transform of the impulse response of the transfer function associated with the virtual position of the audio signal source associated with the n-th audio signal in the i-th frequency bin and J(k) denotes the number of frequency bins of the k-th frequency band.

In a sixth possible implementation form of the third to fifth implementation form of the first aspect of the disclosure, the selector is configured to select the spatial arrangement of the virtual positions of the plurality of audio signal sources by combining the plurality of audio signal spectra and a plurality of left ear transfer functions associated with the virtual positions of the audio signal sources relative to the left ear of the listener to obtain a plurality of left ear directional-speaker spectral profiles and the plurality of audio signal spectra and a plurality of right ear transfer functions associated with the virtual positions of the audio signal sources relative to the right ear of the listener to obtain a plurality of right ear directional-speaker spectral profiles and by selecting one of the plurality of possible spatial arrangements of the virtual positions of the plurality of audio signal sources for which a spectral difference between the left ear directional-speaker spectral profiles and the right ear directional-speaker spectral profiles is smaller than a predefined threshold, in particular a minimum.

In a seventh possible implementation form of the first aspect of the disclosure as such, the selector is configured to select the spatial arrangement of the virtual positions of the plurality of audio signal sources from the plurality of possible spatial arrangements of the virtual positions of the plurality of audio signal sources relative to the listener, the virtual positions of the plurality of audio signal sources being arranged on a circle centered at the listener and having a constant angular separation on the basis of the plurality of audio signal spectra and the plurality of transfer functions associated with each possible spatial arrangement of the virtual positions of the plurality of audio signal sources by determining one of the plurality of possible spatial arrangements of the virtual positions of the plurality of audio signal sources for which the spectral difference between the plurality of transfer functions is larger than a predefined threshold value, preferably a maximum.

In an eighth possible implementation form of the seventh implementation form of the first aspect of the disclosure, the selector is configured to determine the spectral difference between the transfer functions associated with the m-th spatial arrangement of the virtual positions of the plurality of audio signal sources using the following equations:

$$\hat{S}_m = \frac{1}{K}\sum_{k=1}^{K} w_k \hat{\sigma}_{m,k}, \text{ and}$$

$$\hat{\sigma}_{m,k} = \frac{1}{N}\sum_{n=1}^{N}(H_{n,m,k} - \overline{H}_{m,k})^2,$$

wherein $\hat{S}_m$ denotes a scalar value representing the spectral difference between the plurality of transfer functions associated with the m-th spatial arrangement of the virtual positions of the plurality of audio signal sources, K denotes the total number of frequency bands, $w_k$ denotes a weighting factor, $\hat{\sigma}_k$ denotes the variance across the plurality of transfer functions for the k-th frequency band, N denotes the total number of audio signal spectra, $H_{n,m,k}$ denotes the value of the n-th transfer function in the k-th frequency band, and $\overline{H}_{m,k}$ denotes the mean of the transfer functions in the k-th frequency band.

In a ninth possible implementation form of the seventh or eighth implementation form of the first aspect of the disclosure, wherein the selector is configured to determine the value of the n-th transfer function in the k-th frequency band, i.e. $H_{n,m,k}$, is determined by performing an averaging operation over a plurality of frequency bins used for a discrete Fourier transform on the basis of the following equation:

$$H_{n,m,k} = \frac{1}{J(k)}\sum_{i=j(k)}^{j(k+1)-1}|\mathcal{H}_n(i)|,$$

wherein $\mathcal{H}_n$ denotes the value of the discrete Fourier transform of the impulse response of the transfer function associated with the virtual position of the audio signal source associated with the n-th audio signal in the i-th frequency bin and J(k) denotes the number of frequency bins of the k-th frequency band.

In a tenth possible implementation form of the seventh or eighth implementation form of the first aspect of the disclosure, the selector is configured to select the spatial arrangement of the virtual positions of the plurality of audio signal sources on the basis of the plurality of audio signal spectra and the plurality of transfer functions associated with each possible spatial arrangement of the virtual positions of the plurality of audio signal sources by ranking the plurality of audio signal spectra according to a similarity value of the plurality of audio signal spectra.

In an eleventh possible implementation form of the tenth implementation form of the first aspect of the disclosure, the selector is configured to select the spatial arrangement of the virtual positions of the plurality of audio signal sources on the basis of the plurality of audio signal spectra and the plurality of transfer functions associated with each possible spatial arrangement of the virtual positions of the plurality of audio signal sources by assigning the ranked plurality of audio signal spectra to the virtual positions of the selected spatial arrangement of the virtual positions of the plurality of audio signal sources in such a way that the angular separation between audio signal spectra having a large similarity value is maximized.

In a twelfth possible implementation form of the tenth or eleventh implementation form of the first aspect of the disclosure, the selector is configured to compute the similarity value for the plurality of audio signal spectra by (i) computing an average audio signal spectrum and the spectral differences between each audio signal spectrum and the average audio signal spectrum or (ii) by computing the correlation functions between the audio signal spectra.

According to a second aspect the disclosure relates to a signal processing method for processing a plurality of audio signals defining a plurality of audio signal spectra, the plurality of audio signals to be transmitted to a listener in such a way that the listener perceives the plurality of audio signals to originate from virtual positions of a plurality of audio signal sources. The audio signal processing method comprises a step of selecting a spatial arrangement of the virtual positions of the plurality of audio signal sources relative to the listener from a plurality of possible spatial arrangements of the virtual positions of the plurality of audio signal sources relative to the listener, wherein each possible spatial arrangement of the virtual positions of the plurality of audio signal sources is associated with a plurality of transfer functions, wherein the spatial arrangement of the virtual positions of the plurality of audio signal sources is selected on the basis of the plurality of audio signal spectra and the plurality of transfer functions associated with each possible spatial arrangement of the virtual positions of the plurality of audio signal sources, and the step of filtering the plurality of audio signals on the basis of the selected spatial arrangement of the virtual positions of the plurality of audio signal sources relative to the listener, wherein the plurality of filtered audio signals are perceived by the listener to originate from the virtual positions of the plurality of audio signal sources defined by the selected spatial arrangement of the virtual positions of the plurality of audio signal sources relative to the listener.

The audio signal processing method according to the second aspect of the disclosure can be performed by the audio signal processing apparatus according to the first aspect of the disclosure. Further features of the audio signal processing method according to the second aspect of the disclosure result directly from the functionality of the audio signal processing apparatus according to the first aspect of the disclosure and its different implementation forms.

According to a third aspect the disclosure relates to a computer program comprising program code for performing the method according to the second aspect of the disclosure when executed on a computer.

The disclosure can be implemented in hardware and/or software.

BRIEF DESCRIPTION OF THE DRAWINGS

Further embodiments of the disclosure will be described with respect to the following figures, in which:

FIGS. 8A and 8B illustrate how to select the optimal spatial arrangement of virtual positions of a plurality of audio signal sources relative to a listener according to an embodiment.

DETAILED DESCRIPTION OF EMBODIMENTS

In the following detailed description, reference is made to the accompanying drawings, which form a part of the disclosure, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that a disclosure in connection with a described method may also hold true for a corresponding device or system configured to perform the method and vice versa. For example, if a specific method step is described, a corresponding device or apparatus may include a unit to perform the described method step, even if such unit is not explicitly described or illustrated in the figures. Further, it is understood that the features of the various exemplary aspects described herein may be combined with each other, unless specifically noted otherwise.

Figure 1:
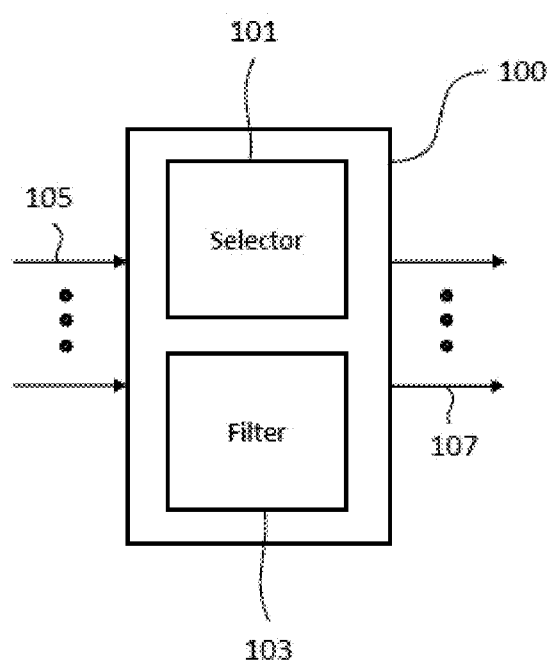
FIG. 1 shows a schematic diagram of an audio signal processing apparatus according to an embodiment.

FIG. 1 shows a schematic diagram of an audio signal processing apparatus 100 according to an embodiment. The audio signal processing apparatus 100 is configured to process a plurality of audio signals 105 defining a plurality of audio signal spectra. The plurality of audio signals 105 are to be transmitted to a listener in such a way that the listener perceives the plurality of audio signals to originate from virtual positions of a plurality of audio signal sources. In an embodiment, the audio signal processing apparatus is part of a virtual spatial audio conference system and the audio signals are the voice signals of the participants of the virtual spatial audio conference.

The audio signal processing apparatus 100 comprises a selector 101 configured to select a spatial arrangement of the virtual positions of the plurality of audio signal sources relative to the listener from a plurality of possible spatial arrangements of the virtual positions of the plurality of audio signal sources relative to the listener.

Each possible spatial arrangement of the virtual positions of the plurality of audio signal sources is associated with a plurality of transfer functions, in particular head-related transfer functions (HTRF) and/or binaural room transfer functions (BTRF). As known to the person skilled in the art, there is a direct correspondence between the HTRFs/BTRFs and their impulse responses, namely the head-related impulse responses (HRIRs) and the binaural room impulse responses (BRIRs).

Moreover, the selector 101 is configured to select the spatial arrangement of the virtual positions of the plurality of audio signal sources on the basis of the plurality of audio signal spectra and the plurality of transfer functions associated with each possible spatial arrangement of the virtual positions of the plurality of audio signal sources.

The term "virtual position" is well known to the person skilled in the art of audio processing. By choosing suitable transfer functions the position, a listener perceives to receive an audio signal emitted by an (virtual) audio signal source. This position is the "virtual position" used herein, and may include techniques in which sources/speakers presented over headphones appear to originate from any desired direction (i.e., a virtual position) in space.

The audio signal processing apparatus 100 further comprises a filter 103 configured to filter the plurality of audio signals 105 on the basis of the selected spatial arrangement of the virtual positions of the plurality of audio signal sources relative to the listener and to produce a plurality of filtered audio signals 107. The plurality of filtered audio signals 107 are perceived by the listener to originate from the virtual positions of the plurality of audio signal sources defined by the selected spatial arrangement of the virtual positions of the plurality of audio signal sources relative to the listener.

Figure 2:
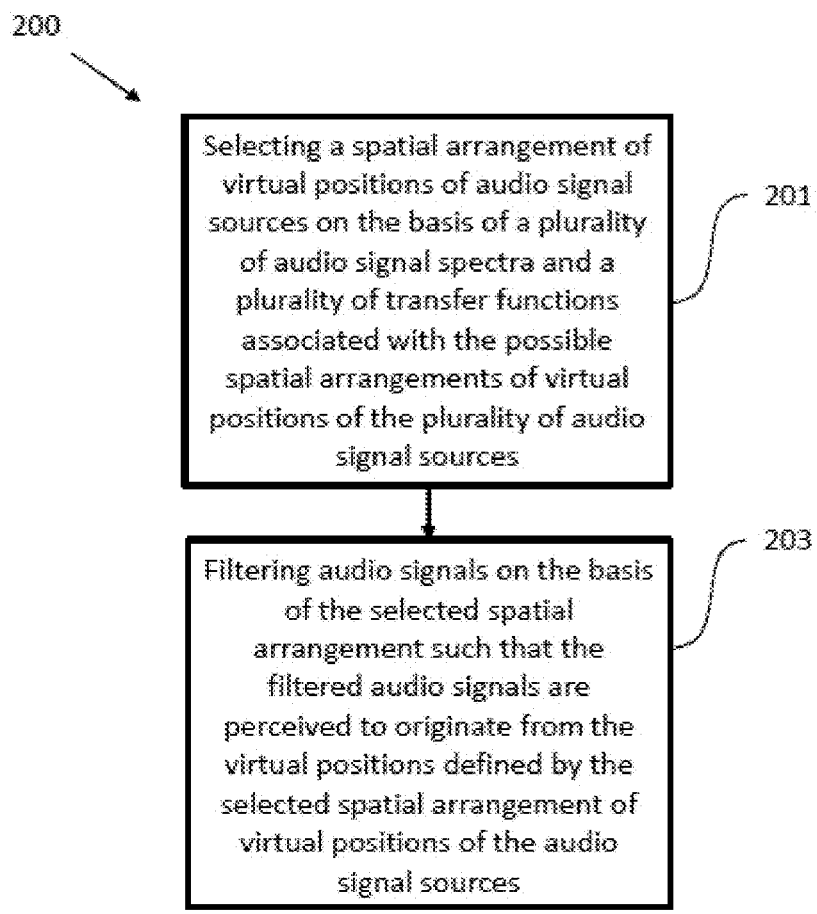
FIG. 2 shows a schematic diagram of an audio signal processing method according to an embodiment.

FIG. 2 shows a schematic diagram of an embodiment of an audio signal processing method 200 for processing a plurality of audio signals 105 defining a plurality of audio signal spectra, the plurality of audio signals to be transmitted to a listener in such a way that the listener perceives the plurality of audio signals to originate from virtual positions of a plurality of audio signal sources.

The audio signal processing method 200 comprises a step 201 of selecting a spatial arrangement of the virtual positions of the plurality of audio signal sources relative to the listener from a plurality of possible spatial arrangements of the virtual positions of the plurality of audio signal sources relative to the listener, wherein each possible spatial arrangement of the virtual positions of the plurality of audio signal sources is associated with a plurality of transfer functions. The spatial arrangement of the virtual positions of the plurality of audio signal sources is selected on the basis of the plurality of audio signal spectra and the plurality of transfer functions associated with each possible spatial arrangement of the virtual positions of the plurality of audio signal sources.

Moreover, the audio signal processing apparatus 200 comprises a step 203 of filtering the plurality of audio signals 105 on the basis of the selected spatial arrangement of the virtual positions of the plurality of audio signal sources relative to the listener to obtain a plurality of filtered audio signals 107. The plurality of filtered audio signals 107 are perceived by the listener to originate from the virtual positions of the plurality of audio signal sources defined by the selected spatial arrangement of the virtual positions of the plurality of audio signal sources relative to the listener.

The audio signal processing method 200 can be performed, for instance, by the audio signal processing apparatus 100 according to the first aspect of the disclosure.

In the following, further implementation forms and embodiments of the audio signal processing apparatus 100 and the audio signal processing method 200 are described.

In an embodiment, the selector 101 of the audio signal processing apparatus 100 is configured to select the spatial arrangement of the virtual positions of the plurality of audio signal sources by combining the plurality of audio signal spectra and the plurality of transfer functions associated with each possible spatial arrangement of the virtual positions of the plurality of audio signal sources. In an embodiment, the plurality of audio signal spectra and the plurality of transfer functions are combined by multiplying the plurality of audio signal spectra and the plurality of transfer functions to obtain a plurality of directional-speaker spectral profiles associated with each possible spatial arrangement of the virtual positions of the plurality of audio signal sources.

Figure 3:
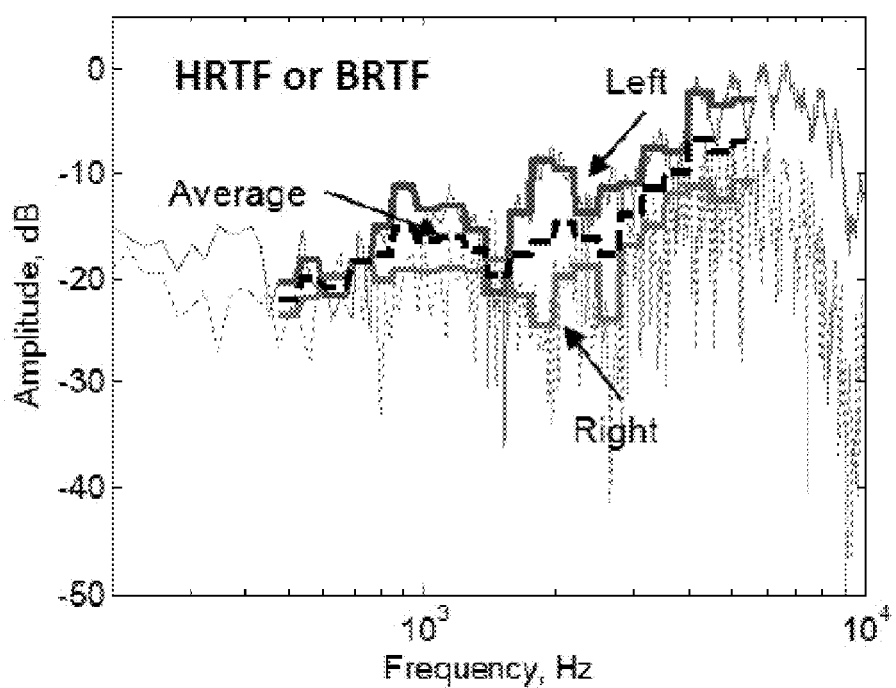
FIG. 3 shows exemplary left, right and average binaural room transfer functions that can be used with an audio signal processing apparatus and method according to an embodiment.

FIG. 3 shows an exemplary transfer function obtained by deriving the average of a left BRTF and a right BRTF. For deriving the exemplary transfer function the left BRTF and the right BRTF are averaged in respective frequency bands. This subband analysis can be done in various ways, such as using quadrature mirror filters (QMF), gammatone filters, or octave or third-octave bands. For the example shown in FIG. 3 the spectra, profiles and transfer functions are computed using a sixth-octave-band analysis, i.e. 1/n-octave bands with n=6 representing the bandwidth of the filter bank. The analysis approximates a constant-Q filter bank by averaging across magnitude bins of a Discrete Fourier Transform (DFT) which is computed using the Fast Fourier Transform (FFT) algorithm. A constant-Q filter bank means that the ratio between the center frequency and bandwidth of the filter remains the same across filters. In an embodiment, the subband analysis is performed over a frequency range relevant for speech and is set to frequencies between 500 and 6300 Hz. This frequency range results in a subband analysis with a total of 21 different ⅙-octave bands. Other options for the upper frequency limit may be 7000 or 8000 Hz.

The person skilled in the art will appreciate that taking the average between left and right HRTF is just one approach to derive a transfer function that can be used in the context of the audio signal processing apparatus 100 and the audio signal processing method 200. For example, either the left or right HRTF/BRTF can be used as the transfer function. The transfer functions, for instance, the HRTF and/or the BRTF, can be computed once and stored for posterior use.

Figure 4:
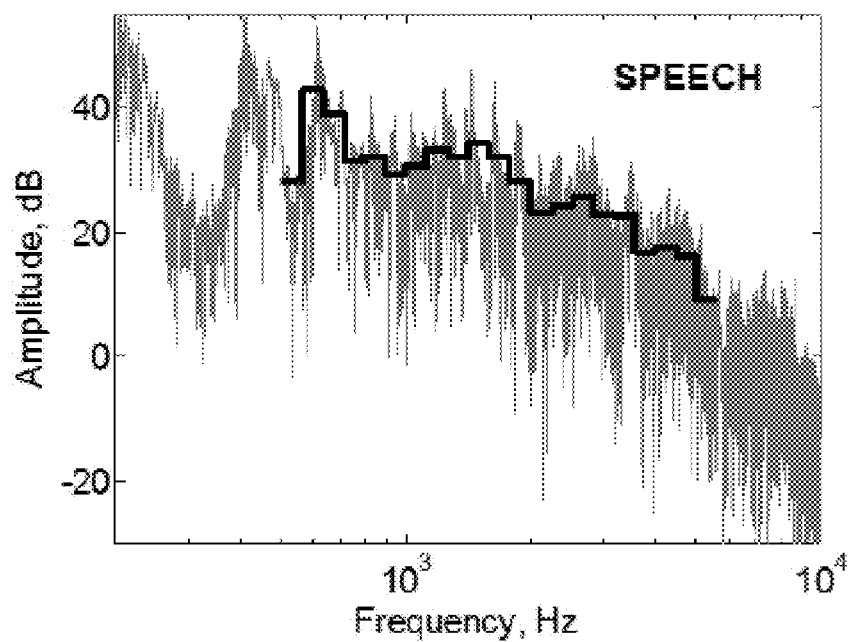
FIG. 4 shows an exemplary audio signal spectrum that can be used with an audio signal processing apparatus and method according to an embodiment.

FIG. 4 shows an exemplary audio signal spectrum that can be used with the audio signal processing apparatus 100 and method 200 according to an embodiment. The thin line in FIG. 4 shows the discrete Fourier transform of an exemplary speech audio signal, i.e. an exemplary audio signal spectrum. The thick line in FIG. 4 shows an averaged or subband representation of the audio signal spectrum that is used, in an embodiment, for computational purposes.

In an embodiment, the value of the audio signal spectrum of the n-th audio signal in the k-th frequency band, i.e. $X_{n,k}$, and/or the value of the transfer function associated with the virtual position of the m-th spatial arrangement of the audio signal source associated with the n-th audio signal in the k-th frequency band, i.e. $H_{m,k}$, is determined by performing an averaging operation over a plurality of frequency bins used for a discrete Fourier transform on the basis of the following equations:

$$X_{n,k} = \frac{1}{J(k)} \sum_{i=j(k)}^{j(k+1)-1} |X(i)|, \text{ and}$$

$$H_{m,k} = \frac{1}{J(k)} \sum_{i=j(k)}^{j(k+1)-1} |\mathcal{H}(i)|,$$

wherein $X(i)$ denotes the value of the discrete Fourier transform of the n-th audio signal in the i-th frequency bin, $\mathcal{H}(i)$ denotes the value of the discrete Fourier transform of the impulse response of the transfer function associated with the virtual position of the audio signal source associated with the n-th audio signal in the i-th frequency bin and $J(k)$ denotes the number of frequency bins of the k-th frequency band.

Figure 5:
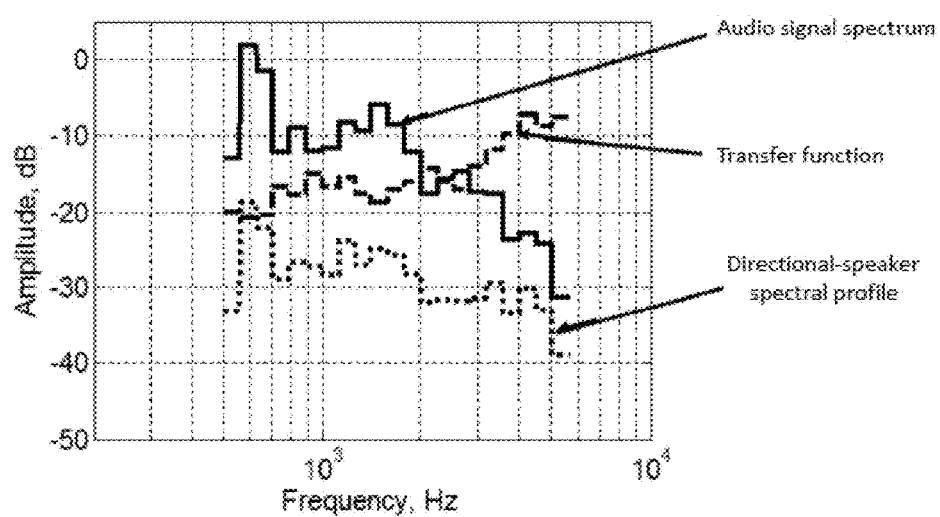
FIG. 5 shows an exemplary directional-speaker spectral profile that can be obtained and used with an audio signal processing apparatus and method according to an embodiment.

FIG. 5 shows how a transfer function, such as the transfer function shown in FIG. 3, and an audio signal spectrum, such as the audio signal spectrum shown in FIG. 4, can be combined by the selector 101 in order to obtain a directional-speaker spectral profile. As can be taken from FIG. 5, the directional-speaker spectral profile is obtained by multiplying the (subband averaged) transfer function with the (subband averaged) audio signal spectrum, or alternatively, by summing their corresponding log-magnitude responses. In the context of the present disclosure, multiplying the transfer function with the audio signal spectrum is the point-wise multiplication of the two vectors defined by the averaged or discretized transfer function and the averaged or discretized audio signal spectrum, respectively. Mathematically, the selector 101 is configured to compute $$Y_{n,m,k} = X_{n,k} H_{m,k},$$

wherein $Y_{n,m,k}$ denotes the value of the n-th directional-speaker spectral profile associated with the m-th spatial arrangement of the virtual positions of the plurality of audio signal sources in the k-th frequency band.

In an embodiment, the selector 101 is configured to select the spatial arrangement of the virtual positions of the plurality of audio signal sources on the basis of the plurality of directional-speaker spectral profiles. In an embodiment, the selector 101 is configured to select the spatial arrangement of the virtual positions of the plurality of audio signal sources by selecting one of the plurality of possible spatial arrangements of the virtual positions of the plurality of audio signal sources for which a spectral difference between the plurality of directional-speaker spectral profiles is larger than a predefined threshold value, preferably a maximum.

In an embodiment, the selector 101 is configured to determine the spectral difference between the directional-speaker spectral profiles associated with the m-th spatial arrangement of the virtual positions of the plurality of audio signal sources using the following equations:

$$S_m = \frac{1}{K}\sum_{k=1}^{K} w_k \sigma_{m,k}, \text{ and}$$

$$\sigma_{m,k} = \frac{1}{N}\sum_{n=1}^{N} (Y_{n,m,k} - \overline{Y}_{m,k})^2,$$

wherein $S_m$ denotes a scalar value representing the spectral difference between the plurality of directional-speaker spectral profiles associated with the m-th spatial arrangement of the virtual positions of the plurality of audio signal sources, K denotes the total number of frequency bands, $w_k$ denotes a weighting factor, $\sigma_{m,k}$ denotes the variance across the directional-speaker spectral profiles for the k-th frequency band, N denotes the total number of audio signal spectra, and $\overline{Y}_{m,k}$ denotes the mean of the directional speaker profiles in the k-th frequency band.

Figure 6A:
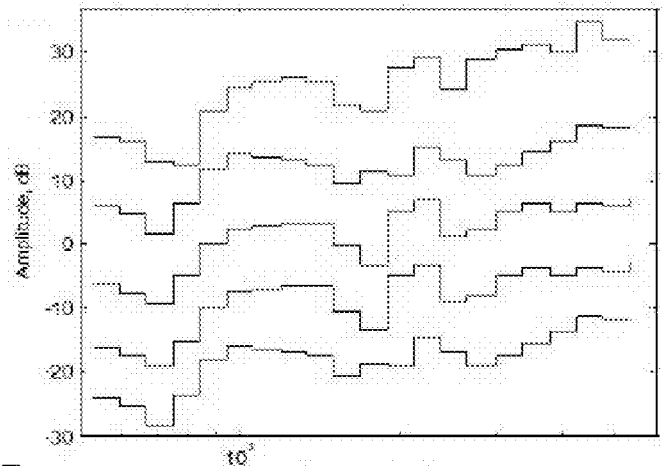
FIG. 6A shows exemplary directional-speaker spectral profiles for the case of five speakers that can be used with an audio signal processing apparatus and method according to an embodiment.
Figure 6B:
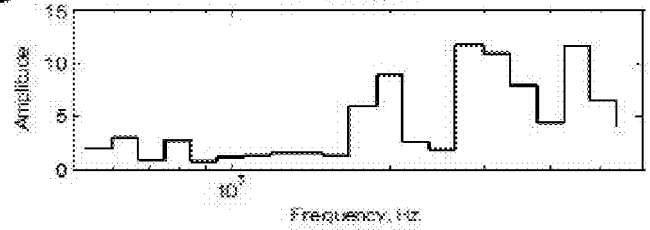
FIG. 6B shows the variance of the exemplary directional-speaker spectral profiles of FIG. 6A.

FIG. 6A shows exemplary directional-speaker spectral profiles for the case of five speakers that can be used with the audio signal processing apparatus 100 and the audio signal processing method 200 according to an embodiment. FIG. 6B shows the variance $\sigma_{m,k}$ for the five exemplary directional-speaker spectral profiles shown in FIG. 6A for the different frequency bands.

Figure 6C:
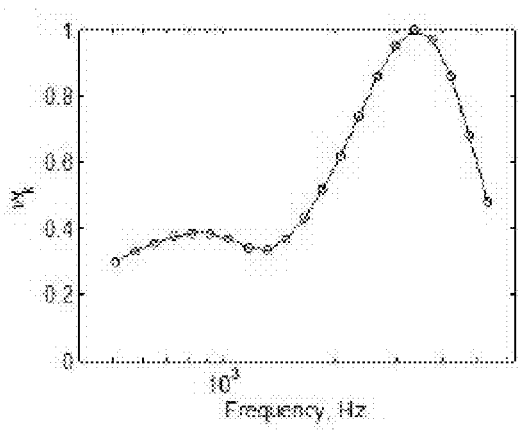
FIG. 6C shows exemplary weighting factors used to integrate human hearing sensitivity in an audio signal processing apparatus and method according to an embodiment.

In an embodiment, the weighting factors $w_k$ used to compute $S_m$, i.e. the spectral difference between the plurality of directional-speaker spectral profiles, can be all set to one. Alternatively, the weighting factors $w_k$ can represent the human auditory sensitivity at the center frequencies of the different frequency bands. In this case, the weighting factors $w_k$ may be computed as the reciprocal of the absolute threshold of hearing normalized by the minimum threshold, i.e. the threshold of the frequency band at which average human audibility is most sensitive. These exemplary weighting factors $w_k$, as derived from the absolute human threshold of hearing, are shown in FIG. 6C.

In order to deal with the possibility that the selector 101 determines at least two spatial arrangements of the virtual positions of the plurality of audio signal sources having the same maximal spectral difference, in an embodiment, the selector 101 is configured to select the spatial arrangement of the virtual positions of the plurality of audio signal sources by combining the plurality of audio signal spectra and a plurality of left ear transfer functions associated with the virtual positions of the audio signal sources relative to the left ear of the listener to obtain a plurality of left ear directional-speaker spectral profiles and the plurality of audio signal spectra and a plurality of right ear transfer functions associated with the virtual positions of the audio signal sources relative to the right ear of the listener to obtain a plurality of right ear directional-speaker spectral profiles and by selecting one of the plurality of possible spatial arrangements of the virtual positions of the plurality of audio signal sources for which the spectral difference between the left ear directional-speaker spectral profiles and the right ear directional-speaker spectral profiles is smaller than a predefined threshold, in particular a minimum.

Figure 7:
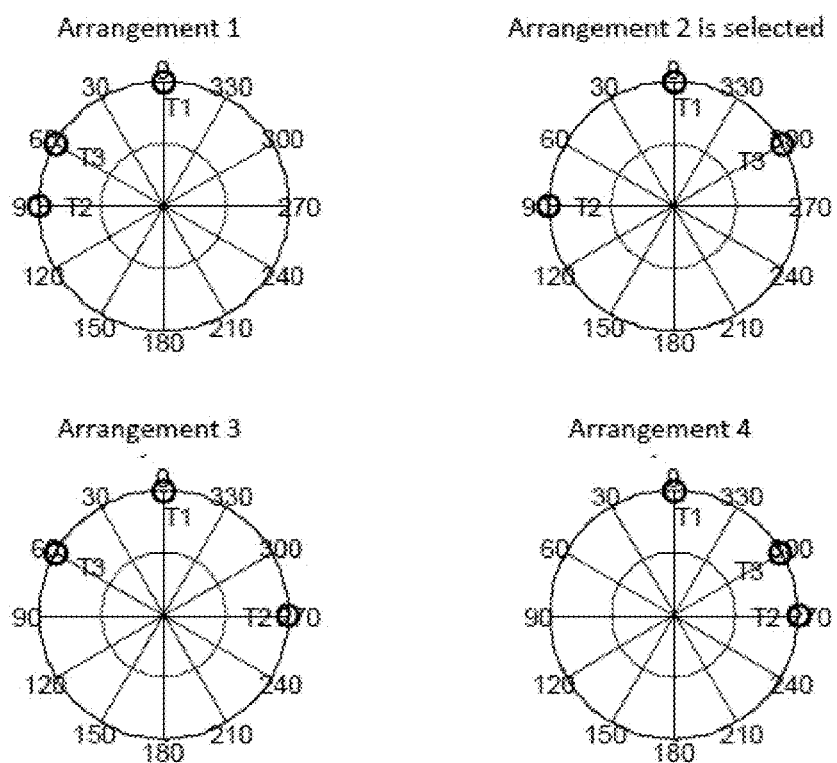
FIG. 7 shows four exemplary spatial arrangements of virtual positions of a plurality of audio signal sources relative to a listener according to an embodiment.

FIG. 7 shows four exemplary spatial arrangements of virtual positions of a plurality of audio signal sources for the case of three speakers, i.e. audio signals, and twelve possible virtual positions, i.e. transfer functions. With N speakers in a virtual spatial conference capable of rendering a total of L different virtual locations, i.e. L different transfer functions, the total number of possible spatial arrangements M is given by $$M = \binom{L}{N} \cdot N! = \frac{L!}{(L-N)! \cdot N!} \cdot N! = \frac{L!}{(L-N)!}$$

Thus, for example, if N=3 speakers and L=12 spatial locations then there are M=1320 possible spatial arrangements. For the example shown in FIG. 7 all four arrangements provide a maximal spectral difference on the basis of a plurality of averaged transfer functions. By using left ear transfer functions and right ear transfer functions an embodiment of the present disclosure allows to select arrangement 2 as the optimal spatial arrangement of the virtual positions of the plurality of audio signal sources that minimizes the spectral difference between the left ear directional-speaker spectral profiles and the right ear directional-speaker spectral profiles.

In an embodiment, the selector 101 is configured to select the spatial arrangement of the virtual positions of the plurality of audio signal sources from the plurality of possible spatial arrangements of the virtual positions of the plurality of audio signal sources relative to the listener, the virtual positions of the plurality of audio signal sources being arranged on a circle centered at the position of the listener and having a constant angular separation, on the basis of the plurality of audio signal spectra and the plurality of transfer functions associated with each possible spatial arrangement of the virtual positions of the plurality of audio signal sources by determining one of the plurality of possible spatial arrangements of the virtual positions of the plurality of audio signal sources for which the spectral difference between the plurality of transfer functions is larger than a predefined threshold value, preferably a maximum.

In an embodiment, the selector 101 is configured to determine the spectral difference between the transfer functions associated with the m-th spatial arrangement of the virtual positions of the plurality of audio signal sources using the following equations:

$$\hat{S}_m = \frac{1}{K}\sum_{k=1}^{K} w_k \hat{\sigma}_{m,k}, \text{ and}$$

$$\hat{\sigma}_{m,k} = \frac{1}{N}\sum_{n=1}^{N} (H_{n,m,k} - \overline{H}_{m,k})^2,$$

wherein $\hat{S}_m$ denotes a scalar value representing the spectral difference between the plurality of transfer functions associated with the m-th spatial arrangement of the virtual positions of the plurality of audio signal sources, K denotes the total number of frequency bands, $w_k$ denotes a weighting factor, $\hat{\sigma}_{m,k}$ denotes the variance across the plurality of transfer functions for the k-th frequency band, N denotes the total number of audio signal spectra, $H_{n,m,k}$ denotes the value of the n-th transfer function in the k-th frequency band, and $\overline{H}_{m,k}$ denotes the mean of the transfer functions in the k-th frequency band.

In an embodiment, the value of the n-th transfer function in the k-th frequency band, i.e. $H_{n,m,k}$, is determined by performing an averaging operation over a plurality of frequency bins used for a discrete Fourier transform on the basis of the following equation:

$$H_{n,m,k} = \frac{1}{J(k)} \sum_{i=j(k)}^{j(k+1)-1} |\mathcal{H}_n(i)|,$$

wherein $\mathcal{H}_n$ denotes the value of the discrete Fourier transform of the impulse response of the transfer function associated with the virtual position of the audio signal source associated with the n-th audio signal in the i-th frequency bin and J(k) denotes the number of frequency bins of the k-th frequency band.

In an embodiment, the selector 101 is configured to select the spatial arrangement of the virtual positions of the plurality of audio signal sources on the basis of the plurality of audio signal spectra and the plurality of transfer functions associated with each possible spatial arrangement of the virtual positions of the plurality of audio signal sources by ranking the plurality of audio signal spectra according to the similarity of the plurality of audio signal spectra. In an embodiment, the selector 101 is configured to compute the similarity value for the plurality of audio signal spectra by (i) computing an average audio signal spectrum and the spectral differences between each audio signal spectrum and the average audio signal spectrum or (ii) by computation the correlation functions between the audio signal spectra.

In an embodiment, the selector 101 is configured to select the spatial arrangement of the virtual positions of the plurality of audio signal sources on the basis of the plurality of audio signal spectra and the plurality of transfer functions associated with each possible spatial arrangement of the virtual positions of the plurality of audio signal sources by assigning the ranked plurality of audio signal spectra to the virtual positions of the selected spatial arrangement of the virtual positions of the plurality of audio signal sources in such a way that the angular separation between audio signal spectra having a small spectral difference, i.e. "similar" audio signal spectra, is maximized.

Figure 8A:
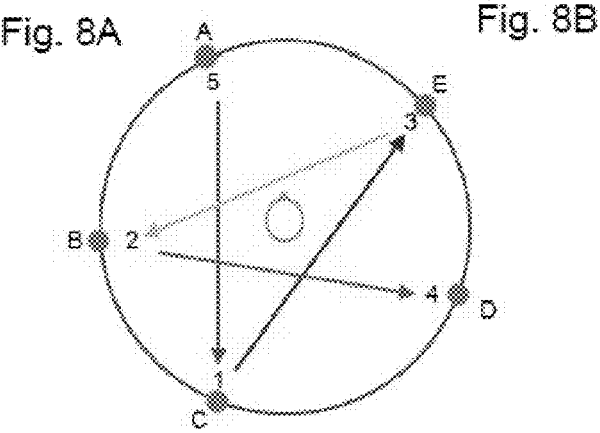
Figure 8A:
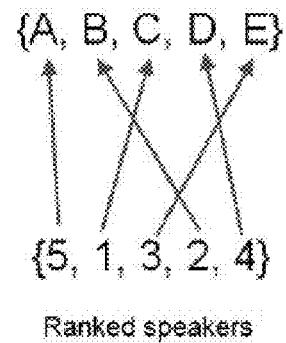

FIGS. 8A and 8B illustrate and example of how to select the optimal spatial arrangement of virtual positions of a plurality of speakers, i.e. audio signal sources, relative to a listener according to an embodiment. A given speaker is arbitrarily selected from the N speakers and a correlation is computed between the audio signal spectrum of the selected speaker and each of the audio signal spectra of the other N−1 speakers. The speaker audio signal spectrum that results in the highest correlation is then selected. The same process is repeated on the newly selected speaker until all speaker audio signal spectra have been ranked.

In the example illustrated in FIGS. 8A and 8B there are N=5 speakers (ordered from 1 to 5 according to the time they first entered in to the virtual spatial audio conference), and the optimal spatial arrangement is formed by the 5 directions labeled A, B, C, D and E. The ranking of speakers according to similarity in audio signal spectra ranks them as the sequence 5, 1, 3, 2 and 4. The assignment of transfer functions starts by arbitrarily assigning the first speaker in the speaker list, i.e. speaker 5, to the first direction in the direction list, i.e. direction A. The next speaker, i.e. speaker 1, whose audio signal spectrum is more similar to speaker 5's audio signal spectrum than to the other speakers, is assigned to the direction with the largest angular separation from direction A. In this particular example there are two options, namely directions C and D. This dual alternative is a consequence of the constraint that the directions have a constant angular separation. Here, an anticlockwise search is chosen and direction C is selected as indicated by the arrow connecting A and C. The process continues by assigning speaker 3 to direction E, because this direction gives the largest angular separation from C. The same process is repeated for speaker 2 (arrow connecting directions E and B) and speaker 4 (arrow connecting directions B and D) until all available directions are occupied.

The person skilled in the art will appreciate that embodiments of the present disclosure can be used for computing an optimal spatial arrangement, i.e. spatial arrangement, for loudspeaker reproduction as well, which includes but is not limited to stereo playback, 5.1., 7.1, and 22.2 channels. Independent of the number of loudspeakers and their spatial locations, these embodiments make use of the audio signal spectra to rank speakers according to spectral differences in a way that is equivalent to the procedure described above. Depending on the number of loudspeakers, their spatial locations and the maximum angular span Θ they cover, the assignment of location to the different speakers can be done in two ways.

In an embodiment, speakers are spatially separated based on simple angular distances. That is, speakers with most similar audio signal spectra are placed at locations with largest angular distance, and speakers with most dissimilar audio signal spectra are placed at locations with smallest angular distance. These locations may be at the exact positions of real loudspeakers or at positions in between loudspeakers which are then created by panning techniques or other sound field rendering technologies, e.g. wavefield synthesis.

In an alternative embodiment, speakers are spatially separated based on directional-speaker spectral profiles, as described above, or based on transfer functions, as described above. In the particular case of crosstalk cancellation systems, the above embodiments can be implemented in the exact same way as for headphone reproduction. Once the optimal spatial arrangement is found, panning techniques or soundfield rendering techniques can be used to place speakers on their optimal positions.

The person skilled in the art will appreciate that the claimed disclosure covers also embodiments where the audio signals and their spectra are not analyzed on the fly, but rather where a plurality of audio signal spectra of a user define a user profile, which in, turn, is represented by a profile audio signal spectrum derived therefrom, for instance, an average of audio signal spectra of a user.

Embodiments of the disclosure may be implemented in a computer program for running on a computer system, at least including code portions for performing steps of a method according to the disclosure when run on a programmable apparatus, such as a computer system or enabling a programmable apparatus to perform functions of a device or system according to the disclosure.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Thus, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

What is claimed is:

1. An audio signal processing apparatus for processing a plurality of audio signals defining a plurality of audio signal spectra, wherein the plurality of audio signals may be transmitted to a listener in such a way that the listener perceives the plurality of audio signals originate from virtual positions of a plurality of audio signal sources, the audio signal processing apparatus comprising:
   a computing hardware; and
   a non-transitory computer-readable storage medium including computer-executable instructions executed by the computing hardware to perform, on the audio signal processing apparatus, a method comprising:
   selecting a spatial arrangement of the virtual positions of the plurality of audio signal sources relative to the listener from a plurality of possible spatial arrangements of the virtual positions of the plurality of audio signal sources relative to the listener, wherein each possible spatial arrangement of the virtual positions of the plurality of audio signal sources is associated with a plurality of transfer functions, and wherein the spatial arrangement of the virtual positions of the plurality of audio signal sources is selected on the basis of the plurality of audio signal spectra and the plurality of transfer functions associated with each possible spatial arrangement of the virtual positions of the plurality of audio signal sources wherein the plurality of audio signal spectra and the plurality of transfer functions associated with each possible spatial arrangement of the virtual positions of the plurality of audio signal sources are selected to obtain a plurality of directional-speaker spectral profiles associated with each possible spatial arrangement of the virtual positions of the plurality of audio signal sources;
   further selecting the spatial arrangement of the virtual positions of the plurality of audio signal sources on the basis of the plurality of directional-speaker spectral profiles; and
   filtering the plurality of audio signals on the basis of the selected spatial arrangement of the virtual positions of the plurality of audio signal sources relative to the listener, wherein the plurality of filtered audio signals are perceived by the listener to originate from the virtual positions of the plurality of audio signal sources defined by the selected spatial arrangement of the virtual positions of the plurality of audio signal sources relative to the listener.

2. The audio signal processing apparatus of claim 1, wherein the method further comprises combining the plurality of audio signal spectra and the plurality of transfer functions associated with each possible spatial arrangement of the virtual positions of the plurality of audio signal sources to obtain a plurality of directional-speaker spectral profiles associated with each possible spatial arrangement of the virtual positions of the plurality of audio signal sources by multiplying the plurality of input audio signal spectra and the plurality of transfer functions associated with each possible spatial arrangement of the virtual positions of the plurality of audio signal sources.

3. The audio signal processing apparatus of claim 1, wherein the method further comprises selecting the spatial arrangement of the virtual positions of the plurality of audio signal sources by selecting one of the plurality of possible spatial arrangements of the virtual positions of the plurality of audio signal sources for which a spectral difference between the plurality of directional-speaker spectral profiles is larger than a predefined threshold value, in particular a maximum.

4. The audio signal processing apparatus of claim 3, wherein the method further comprises determining the spectral difference between the directional-speaker spectral profiles associated with the m-th spatial arrangement of the virtual positions of the plurality of audio signal sources using the following equations:

$$S_m = \frac{1}{K}\sum_{k=1}^{K} w_k \sigma_{m,k},$$

$$\sigma_{m,k} = \frac{1}{N}\sum_{n=1}^{N} (Y_{n,m,k} - \overline{Y}_{m,k})^2, \text{ and}$$

$$Y_{n,m,k} = X_{n,k} H_{m,k},$$

wherein $S_m$ is the spectral difference between the plurality of directional-speaker spectral profiles associated with the m-th spatial arrangement of the virtual positions of the plurality of audio signal sources, $w_k$ are weighting factors, $\sigma_{m,k}$ is the variance across the directional-speaker spectral profiles for a frequency band k, $\overline{Y}_{m,k}$ is the frequency band average across the plurality of directional-speaker spectral profiles, $Y_{n,k,m}$ is the magnitude of a nth directional-speaker spectral profile in a frequency band k, $X_{n,k}$ denotes the value of the audio signal spectrum of the n-th audio signal in the k-th frequency band and $H_{m,k}$ denotes the value of the transfer function associated with the virtual position of the audio signal source associated with the n-th audio signal in the k-th frequency band.

5. The audio signal processing apparatus of claim 4, wherein the method further comprises determining at least one of the value of the audio signal spectrum of the n-th audio signal in the k-th frequency band and the value of the transfer function associated with the virtual position of the audio signal source associated with the n-th audio signal in the k-th frequency band by performing an averaging operation over a plurality of frequency bins on the basis of the following equations:

$$X_{n,k} = \frac{1}{J(k)}\sum_{i=j(k)}^{j(k+1)-1} |\mathcal{X}(i)|, \text{ and}$$

$$H_{m,k} = \frac{1}{J(k)}\sum_{i=j(k)}^{j(k+1)-1} |\mathcal{H}(i)|,$$

wherein $\mathcal{X}(i)$ denotes the value of the discrete Fourier transform of the n-th audio signal in the i-th frequency bin, $\mathcal{H}(i)$ denotes the value of the discrete Fourier transform of the impulse response of the transfer function associated with the virtual position of the audio signal source associated with the n-th audio signal in the i-th frequency bin and J(k) denotes the number of frequency bins of the k-th frequency band.

6. The audio signal processing apparatus of claim 3, wherein the method further comprises selecting the spatial arrangement of the virtual positions of the plurality of audio signal sources by combining the plurality of audio signal spectra and a plurality of left ear transfer functions associated with the virtual positions of the audio signal sources relative to the left ear of the listener to obtain a plurality of left ear directional-speaker spectral profiles and the plurality of audio signal spectra and a plurality of right ear transfer functions associated with the virtual positions of the audio signal sources relative to the right ear of the listener to obtain a plurality of right ear directional-speaker spectral profiles and by selecting one of the plurality of possible spatial arrangements of the virtual positions of the plurality of audio signal sources for which a spectral difference between the left ear directional-speaker spectral profiles and the right ear directional-speaker spectral profiles is smaller than a predefined threshold, in particular a minimum.

7. The audio signal processing apparatus of claim 1, wherein the method further comprises selecting the spatial arrangement of the virtual positions of the plurality of audio signal sources from the plurality of possible spatial arrangements of the virtual positions of the plurality of audio signal sources relative to the listener, the virtual positions of the plurality of audio signal sources being arranged on a circle centered at the listener and having a constant angular separation on the basis of the plurality of audio signal spectra and the plurality of transfer functions associated with each possible spatial arrangement of the virtual positions of the plurality of audio signal sources by determining one of the plurality of possible spatial arrangements of the virtual positions of the plurality of audio signal sources for which the spectral difference between the plurality of transfer functions is larger than a predefined threshold value, in particular a maximum.

8. The audio signal processing apparatus of claim 7, wherein the method further comprises determining the spectral difference between the transfer functions associated with the m-th spatial arrangement of the virtual positions of the plurality of audio signal sources using the following equations:

$$\hat{S}_m = \frac{1}{K}\sum_{k=1}^{K} w_k \hat{\sigma}_{m,k}, \text{ and}$$

$$\hat{\sigma}_{m,k} = \frac{1}{N} \sum_{n=1}^{N} (H_{n,m,k} - \overline{H}_{m,k})^2,$$

wherein $\hat{S}_m$ denotes a scalar value representing the spectral difference between the plurality of transfer functions associated with the m-th spatial arrangement of the virtual positions of the plurality of audio signal sources, K denotes the total number of frequency bands, $w_k$ denotes a weighting factor, $\hat{\sigma}_{m,k}$ denotes the variance across the plurality of transfer functions for the k-th frequency band, N denotes the total number of audio signal spectra, $H_{n,m,k}$ denotes the value of the n-th transfer function in the k-th frequency band, and $\overline{H}_{m,k}$ denotes the mean of the transfer functions in the k-th frequency band.

9. The audio signal processing apparatus of claim 8, wherein the method further comprises determining the value of the n-th transfer function in the k-th frequency band by performing an averaging operation over a plurality of frequency bins on the basis of the following equation:

$$H_{n,m,k} = \frac{1}{J(k)} \sum_{i=j(k)}^{j(k+1)-1} |\mathcal{H}_n(i)|,$$

wherein $\mathcal{H}_n$ denotes the value of the discrete Fourier transform of the impulse response of the transfer function associated with the virtual position of the audio signal source associated with the n-th audio signal in the i-th frequency bin and J(k) denotes the number of frequency bins of the k-th frequency band.

10. The audio signal processing apparatus of claim 7, wherein the method further comprises selecting the spatial arrangement of the virtual positions of the plurality of audio signal sources on the basis of the plurality of audio signal spectra and the plurality of transfer functions associated with each possible spatial arrangement of the virtual positions of the plurality of audio signal sources by ranking the plurality of audio signal spectra according to a similarity value of the plurality of audio signal spectra.

11. The audio signal processing apparatus of claim 10, wherein the method further comprises selecting the spatial arrangement of the virtual positions of the plurality of audio signal sources on the basis of the plurality of audio signal spectra and the plurality of transfer functions associated with each possible spatial arrangement of the virtual positions of the plurality of audio signal sources by assigning the ranked plurality of audio signal spectra to the virtual positions of the selected spatial arrangement of the virtual positions of the plurality of audio signal sources in such a way that the angular separation between audio signal spectra having a large similarity value is maximized.

12. The audio signal processing apparatus of claim 10, wherein the method further comprises computing the similarity value for the plurality of audio signal spectra by computing at least one of (i) an average audio signal spectrum and the spectral differences between each audio signal spectrum and the average audio signal spectrum and (ii) the correlation functions between the audio signal spectra.

13. A signal processing method for processing a plurality of audio signals defining a plurality of audio signal spectra, wherein the plurality of audio signals may be transmitted to a listener in such a way that the listener perceives the plurality of audio signals to originate from virtual positions of a plurality of audio signal sources, the audio signal processing method comprising the following steps:

selecting a spatial arrangement of the virtual positions of the plurality of audio signal sources relative to the listener from a plurality of possible spatial arrangements of the virtual positions of the plurality of audio signal sources relative to the listener, wherein each possible spatial arrangement of the virtual positions of the plurality of audio signal sources is associated with a plurality of transfer functions, and wherein the spatial arrangement of the virtual positions of the plurality of audio signal sources is selected on the basis of the plurality of input audio signal spectra and the plurality of transfer functions associated with each possible spatial arrangement of the virtual positions of the plurality of audio signal sources wherein the plurality of audio signal spectra and the plurality of transfer functions associated with each possible spatial arrangement of the virtual positions of the plurality of audio signal sources are selected to obtain a plurality of directional-speaker spectral profiles associated with each possible spatial arrangement of the virtual positions of the plurality of audio signal sources;

further selecting the spatial arrangement of the virtual positions of the plurality of audio signal sources on the basis of the plurality of directional-speaker spectral profiles; and filtering the plurality of audio signals on the basis of the selected spatial arrangement of the virtual positions of the plurality of audio signal sources relative to the listener, wherein the plurality of filtered audio signals are perceived by the listener to originate from the virtual positions of the plurality of audio signal sources defined by the selected spatial arrangement of the virtual positions of the plurality of audio signal sources relative to the listener.

14. A non-transitory computer readable medium including computer-executable instructions executed by a computing hardware to perform, a method comprising:

selecting a spatial arrangement of the virtual positions of the plurality of audio signal sources relative to the listener from a plurality of possible spatial arrangements of the virtual positions of the plurality of audio signal sources relative to the listener, wherein each possible spatial arrangement of the virtual positions of the plurality of audio signal sources is associated with a plurality of transfer functions, and wherein the spatial arrangement of the virtual positions of the plurality of audio signal sources is selected on the basis of the plurality of input audio signal spectra and the plurality of transfer functions associated with each possible spatial arrangement of the virtual positions of the plurality of audio signal sources wherein the plurality of audio signal spectra and the plurality of transfer functions associated with each possible spatial arrangement of the virtual positions of the plurality of audio signal sources are selected to obtain a plurality of directional-speaker spectral profiles associated with each possible spatial arrangement of the virtual positions of the plurality of audio signal sources;

further selecting the spatial arrangement of the virtual positions of the plurality of audio signal sources on the basis of the plurality of directional-speaker spectral profiles; and filtering the plurality of audio signals on the basis of the selected spatial arrangement of the virtual positions of the plurality of audio signal sources relative to the listener, wherein the plurality of filtered audio signals are perceived by the listener to originate from the virtual positions of the plurality of audio signal sources defined by the selected spatial arrangement of the virtual positions of the plurality of audio signal sources relative to the listener.

* * * * *